United States Patent Office 3,388,176
Patented June 11, 1968

3,388,176
PROCESS AND COMPOSITION FOR CHLORINATING ACETYLENE WITH AQUEOUS CUPRIC CHLORIDE SOLUTIONS TO PRODUCE TRICHLORETHYLENE AND PERCHLORETHYLENE
John Leo Sheard, Lewiston, N.Y., assignor to E. I. du Pont de Nemours and Company, Wilmington, Del.
No Drawing. Filed May 13, 1966, Ser. No. 549,820
10 Claims. (Cl. 260—654)

ABSTRACT OF THE DISCLOSURE

Process and composition for chlorinating acetylene with aqueous copper chloride solutions in which the formation of trichlorethylene and/or perchlorethylene is promoted by maintaining at least 50% of the copper in the cupric form while using a compound such as pyridine hydrochloride to increase productivity, and while using a buffer phosphoric acid, acetic acid or one of certain salts thereof in order to maintain low acidity.

CROSS-REFERENCE TO RELATED APPLICATIONS

Garnett, S.N. 434,702, filed Feb. 23, 1965; Copelin and Sheard, S.N. 505,979, filed Oct. 1, 1965; Todd, S.N. 549,-821, filed May 13, 1966.

BACKGROUND OF THE INVENTION

It is known from British Patent 987,553 (published Mar. 31, 1965) that, when acetylene is being chlorinated with an aqueous copper chloride solution, the reaction can be directed in such a way as to favor the formation of trichlorethylene and/or perchlorethylene, provided one maintains more than 50% of the copper in the cupric form while maintaining a relatively low acidity, i.e., a pH-value of 0–3 as defined hereinafter. If less than 50% of the copper exists in the cupric form (i.e., more than 50% is in the cuprous form), or if the system is relatively more acidic, then the reaction tends to produce, instead, the less highly chlorinated products such as trans-dichlorethylene and/or vinylidene chloride.

More recently, as disclosed in Copelin and Sheard, S.N. 505,979, filed Oct. 1, 1965, it has been discovered that the hydrochloride addition products of certain pyridine compounds, when added to the foregoing chlorination processes, markedly improve their productivity.

The reaction of acetylene with cupric chloride to produce either trichlorethylene or perchlorethylene also yields, as a by-product, hydrogen chloride. The reactions are as follows:

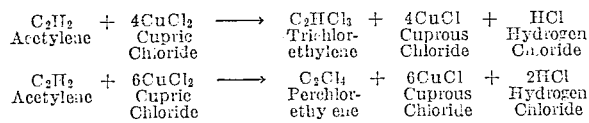

DESCRIPTION OF THE INVENTION

It has now been discovered that the ability of this reaction system to consistently produce large proportions of trichlorethylene and/or perchlorethylene over long periods of time is greatly improved by using the pyridine hydrochloride type of promoter and by also having a certain type of buffer present, in order to maintain the desired low acidity level. The buffers found to be useful are phosphoric acid, acetic acid, and certain salts thereof, as defined hereinbelow.

Accordingly, this invention provides processes for producing trichlorethylene and/or perchlorethylene which comprise contacting acetylene at a temperature of from about 60° C. to about 130° C. with an aqueous catalyst composition containing (a) from about 2 mols to about 10 mols of copper chloride per liter of solution, at least 50% of the copper content of which is in the cupric form; (b) from about ½ mol to about 6 mols, per liter of solution, of a hydrochloride addition product of a pyridine compound taken from the group consisting of pyridine and derivatives of pyridine containing no more than two substituents, which substituents are attached to a carbon atom in the pyridine ring and are taken from the group consisting of methyl, ethyl, chloro and carboxyl; and (c) at least 0.1 mol per liter of a buffer from the group consisting of phosphoric acid; acetic acid; the ammonium and alkali metal acetates, mono-hydrogen phosphates; and di-hydrogen phosphates; and mixtures thereof; the amount of the buffer being such that, when said aqueous composition is diluted with an equal volume of distilled water, the resulting diluted solution exhibits a pH-value in the range of about 1 to about 6. This invention also provides aqueous catalyst compositions useful for the chlorination of acetlyene, said compositions consisting essentially of the above ingredients in the specified proportions.

The process is carried out at a temperature of from about 60° C. to about 130° C., and preferably from about 80° C. to about 120° C. At temperatures below about 60° C., the reaction tends to proceed too slowly to be economically attractive. The upper limit is determined by pressure considerations. Pressures above about 50 lbs./sq. inch gauge are not generally considered safe when handling acetylene; and at pressures lower than 50 p.s.i.g., the aqueous catalyst compositions tend to lose water too rapidly by evaporation if the temperature exceeds about 130° C. Pressures of about 5 to 20 p.s.i.g. are preferred. The process is usually carried out at temperatures which approximate, or are somewhat lower than, the boiling point of the aqueous catalyst composition at the prevailing pressure.

The total copper content of the aqueous catalyst composition is from about 2 mols to about 10 mols of copper chloride per liter of solution, and preferably from about 4 mols to about 8 mols. In general, high copper contents favor high productivity, i.e., a high productivity of useful chlorinated hydrocarbon products per liter of aqueous composition. On the other hand, as the copper content gets higher, more difficulty is encountered in keeping the salts from precipitating out of the compositon. At low temperatures, when the catalyst compositions of this invention are not being used precipitation of ingredients and/or freezing up of the compositions are not harmful. At working temperatures, however it is preferable that the ingredients be either dissolved or else in the form of a sufficiently mobile aqueous slurry to be readily pumpable.

In order to maintain the larger amounts of copper salts in solution, it is often desirable to employ one or more supplemental chlorides, as pointed out in Garnett, S.N. 434,702, filed Feb. 23, 1965. The particular supplemental chlorides which are useful in the present invention are the ammonium and alkali metal chlorides, which may be used in concentrations of from about 1 mol. to about 4 mols per liter.

At least 50% of the total copper content of the system should be in the cupric form. If the cupric content is less than 50% (i.e., more than 50% is in the cuprous form), the reaction tends to produce mainly dichlorethylenes, rather than trichlorethylene and/or perchlorethylene. As a practical matter, it is difficult to maintain the cupric content close to 100% for any considerable length of time because the cupric chloride is constantly being converted to cuprous chloride as a necessary part of the over-all reaction. Furthermore, it is actually advantageous to have moderate amounts of cuprous chloride present because this increases the total amount of copper which can be dissolved in the system, which in turn increases the productivity. All things considered, cupric contents in the range of about 60% to about 90% of the total copper content are preferred.

When the cupric content gets below the desired range it can be regenerated by treatment with oxygen plus hydrogen chloride. This can be accomplished by periodically shutting off the acetylene feed to the main, or "make," reactor and replacing it by oxygen plus hydrogen chloride until the desired cupric content has been achieved. Alternately, the catalyst composition may be removed either batchwise or continuously, to a separate "oxidizer," into which oxygen plus hydrogent chloride are introduced, all according to methods known in the art. The oxygen may be supplied in the form of air, particularly if the regeneration is carried out in a separate "oxidizer." The regeneration reaction is as follows:

$$4CuCl + 4HCl + O_2 \rightarrow 4CuCl_2 + 2H_2O$$

The pyridine hydrochloride addition products which are useful in the present invention include pyridine hydrochloride itself and derivatives thereof wherein one or two methyl, ethyl, chloro or carboxyl groups are attached directly to a carbon atom in the pyridine ring. The substituent groups may be attached either at the alpha, beta or gamma position. Examples include pyridine hydrochloride, picoline (i.e., methyl pyridine) hydrochloride, nicotinic acid (i.e., beta carboxy pyridine) hydrochloride and beta-chloropyridine hydrochloride. Pyridine hydrochloride is preferred.

The pyridine compound can be introduced as such and then allowed to react with hydrogen chloride in situ, in order to form the hydrochloride addition product. Alternately, the pyridine hydrochloride addition product can be added directly. The amount of the pyridine hydrochloride addition product may vary from about ½ mol per liter to about 6 mols per liter.

The reason that the pyridine hydrochloride addition products give superior results is not fully understood. It is believed that they increase the solubility and/or availability of the cuprous species, thereby improving the over-all productivity of the system. It is also belived that they improve the solubility of the hydrocarbon (or chlorohydrocarbon) reactant in the system. Irrespective of the theory, however, the fact remains that the presence of pyridine hydrochloride addition product can increase the productivity of the over-all system by as much as 100% or more, and can also greatly improve the proportion of the acetylene that is converted to the more highly chlorinated products.

The buffers which have been found to be useful according to this invention are phosphoric acid, acetic acid, the ammonium and alkali metal acetates, the ammonium and alkali metal mono- and di-hydrogen phosphates, and mixtures thereof. Other buffer materials such as phthalic acid which produce similar effects may also be used.

The amount of the buffer employed is such that when the aqueous composition is diluted with an equal volume of distilled water, the resulting diluted solution exhibits a pH-value (as measured with a glass electrode) in the range of about 1 to about 6. The member thus determined is referred to herein as the "p-H value." The reason for using this number is that the aqueous compositions themselves, prior to dilution, are frequently so concentrated that it is not truly meaningful to refer to their pH.

At least 0.1 mol of buffer per liter should be present in order to obtain the advantageous results of the present invention. When the acid phosphates (including phosphoric acid) are employed, the concentration is generally between about ¼ mol and about 2 mols per liter, and preferably between about ½ mol and about 1½ mols per liter. The acetates (including acetic acid) are generally employed in concentrations between about ¾ mol and about 5 mols per liter, and preferably between about 1½ mols and about 4 mols per liter. Combinations, for example, of acetic acid plus potassium acetate, or of phosphoric acid plus monoammonium dihydrogen phosphate may advantageously be used, thereby making it possible to achieve excellent control at specific pH-values.

In order to obtain the required pH-values, it is necessary that the hydrogen chloride content of the aqueous catalyst compositions be controlled to some extent, but not nearly as precisely as when no buffer is present. As indicated above, the regeneration reaction involves addition of hydrogen chloride. The amount of hydrogen chloride so added, however, should not be so much in excess of the amount actually required for regeneration that the buffer can no longer compensate for it and bring about the desired pH-value. In general, the amount of hydrogen chloride thus added is not more than 2% in excess of the amount necessary to effect the regeneration, this 2% figure being based upon the weight of the aqueous catalyst composition. Preferably, the amount of excess hydrogen chloride used in the regeneration does not exceed 1%. On the other hand, at least some acidity is needed. Otherwise, if the reaction mixture is neutral or alkaline, the process tends to produce large quantities of acetylene dimers and polymers, which are undesired in the present process. Hydrogen chloride is produced as a by-product of the reaction; and at the same time, hydrogen chloride may be boiled out of the aqueous catalyst composition, especially if the temperature is relatively high and the pressure is relatively low. All of these factors must be taken into consideration when determining the operating parameters, but it is much easier to control the system effectively and continuously when the buffer is present. If the acidity gets too high, the process will tend to yield dichlorethylenes, at the expense of trichlorethylene and/or perchlorethylene.

Other chlorides which may be present in the system include ferric chloride, which tends to keep a high proportion of the copper chloride in the cupric form, and mercury chloride, which tends to promote the activity of certain of the aqueous catalyst compositions.

The acetylene is generally introduced by means of a sparger or other mechanism which facilitates good contact between the acetylene and the aqueous catalyst compositions. Good mixing, as by agitation, is important and may often be the limiting factor in determining the productivity of a given unit.

Due to the corrosive nature of the aqueous catalyst compositions, it is preferred to use corrosion-resistant materials throughout. Graphite or glass-lined kettles may be used. Other vessels may be of phenol-formaldehyde/ asbestos or bricklined steel. Piping may be of phenol-formaldehyde/asbestos or perfluorocarbon-lined steel. Solution-contacting pump parts may be of titanium, tantalum, or perfluorocarbon resin.

The product is generally taken overhead from the "make" reactor and recovered by distillation or other known methods. Unreacted acetylene and certain of the partially chlorinated intermediates (primarily vinylidene chloride) may be recycled. Any hydrogen chloride that is recovered overhead may be employed in the catalyst regeneration step. In preferred embodiments of the present invention, trichlorethylene and/or perchlorethylene constitute more than 50% of the crude mixture of chlorinated hydrocarbon products obtained from the process.

In order to obtain optimum results over a long period of time, it is highly important that the degree of acidity, or the pH-value, be carefully controlled within a narrow range. The optimum degree of acidity varies somewhat depending upon factors such as the average ratio of cupric to cuprous copper, the nature of the product desired, and other factors. Other things being equal, pH-values on the high side, i.e., from about 3 up toward 6, tend to favor the formation of perchlorethylene, whereas somewhat lower pH-values, i.e., from about 2 to about 4, tend to favor the formation of trichlorethylene. The pH-values employed in the present invention are, generally speaking, somewhat higher than those used in the prior art, primarily because this invention makes it possible to control the pH-value accurately at these higher levels by means of the use of the particular buffers.

In the absence of the buffer, it is difficult to control the amount of hydrogen chloride addition in the "oxidizer" step precisely enough to give good control of the pH-value. Furthermore, hydrogen chloride is continuously being produced in the "make" reactor, some of which may continuously be undergoing removal via the gases being taken off overhead. If it were possible to control all of these variables with absolute precision in a large-scale plant, it might be possible to obtain good results without the buffer. As a practical matter, however, this high degree of precision is not attainable over any considerable period of time, and the presence of the buffer, coupled with the presence of the pyridine hydrochloride type promoter, produces major commercial advantages, in terms of both the total productivity, and the proportion of the desired product that is present in the crude mixture of chlorinated hydrocarbons obtained.

The following examples are intended to illustrate, but not to limit, the invention. Unless otherwise indicated, all of these examples were carried out using a one liter, steam-jacketed glass kettle (often designated as a "resin kettle"), equipped with a vaned disc stirrer operating at 900 revolutions per minute, a gas feed tube, and a condenser system.

The condenser system involved a Y-shaped condenser tube. The left arm of the Y was cooled externally with water; the right arm of the Y, with Dry Ice plus trichlorethylene. The exit gases left the top of the reactor through a curved tube which led down into the top of the left (i.e., the water-cooled) arm of the Y-shaped tube. The gases passed down through this arm and then up through the right arm, with the off gas then being vented. The third (i.e., the bottom) leg of the Y-tube consisted of a water-cooled, graduated receiver for collection of the total condensate.

Acetylene was fed into the kettle at the rate of 2.65 to 3.0 liters (standard temperature and pressure) per minute. The kettle contained 400 ml. of aqueous catalyst composition, which was maintained at 95° C. to 100° C. The pressure was slightly above atmospheric. At 4-minute intervals, the product which had been collected was drained into a graduate; the organic layer was analyzed by chromatography; and the aqueous layer was returned to the reactor. At the end of a run, the copper was reoxidized to the desired cupric level by introducing oxygen plus hydrogen chloride.

Example 1

The following aqueous catalyst composition, in the amount of 400 ml., was made up in the kettle by direct addition of the chemicals in the order indicated:

|  | Amount (grams) | Mols/liter |
| --- | --- | --- |
| Pyridine hydrochloride | 184 | 4.0 |
| Phosphoric acid (85%) | 40 | .85 |
| CuCl | 10 | .25 |
| $CuCl_2 \cdot 2H_2O$ | 323 | 4.75 |
| $FeCl_3$ | 64 | 1.0 |
| $H_2O$ | 50 |  |

The resulting mixture was heated by turning on the steam to the jacket, with the stirrer turning slowly to hasten solution and with a slow bleed of nitrogen gas passing into the kettle to maintain an inert atmosphere. When solution had been completed at 95°–96° C., the composition was sampled and the acetylene flow was commenced. The pH-value during the run was 1.48 to 1.96. The total copper content was 5 mols per liter. At the stage where 80% of the copper was in the cupric form, 10% of the acetylene feed was being converted to chlorinated products. Results at specific cupric levels were as follows:

| Percent Total Copper in Cupric Form | Rate of Product Formation [1] (gm./l./min.) | Composition of Product | | |
| --- | --- | --- | --- | --- |
|  |  | DCE [2] | Tri [3] | Per [4] |
| 86.2 | 1.80 | 36.2 | 58.8 | 4.4 |
| 79.0 | 3.45 | 41.6 | 54.7 | 3.0 |
| 67.7 | 5.40 | 47.4 | 49.6 | 1.8 |
| 55.2 | 5.97 | 58.4 | 39.0 | 0.7 |

[1] Reported in terms of grams of all chlorinated products produced per liter of aqueous catalyst composition per minute.
[2] DCE stands for trans-dichlorethylene.
[3] Tri stands for trichlorethylene.
[4] Per stands for perchlorethylene.

This example shows that the productivity is high when using the combination of pyridine hydrochloride promoter plus phosphoric acid buffer, and that the pH-value remains within a controlled and narrow range. The proportion of trichlorethylene produced is highest at the higher cupric levels, but the over-all productivity (and thus the total production of trichlorethylene per unit of time) is higher at the somewhat lower cupric levels.

Example 2

An aqueous catalyst composition was prepared exactly as in Example 1, except that 46 grams of monoammonium dihydrogen phosphate was also added, giving a concentration of 1 mol per liter of the $(NH_4)H_2PO_4$. The pH-value in this run was higher, i.e., 2.90 to 2.95, and it stayed within an even narrower range. At the 72% cupric level, the composition of the product was 67.3% trichlorethylene and 3.7% perchlorethylene, indicating that the somewhat higher pH-value markedly increases the proportion of trichloroethylene in the product.

Example 3

In this example, phthalic acid in the amount of 7 grams (equivalent to 0.1 mol per liter) was used in place of the phosphoric acid used in Example 1, all other conditions being the same as in Example 1. The pH-value remained essentially constant at 2.21. At the 73% cupric level, the rate of product formation was 4.75 grams/liter/minute, and the product composition was 57.3% trichlorethylene and 3.4% perchlorethylene.

Example 4

All conditions in this example were the same as in Example 1, except that the vaned disc agitator speed was increased from 900 r.p.m. to 2000 r.p.m. The pH-value was between 1.52 and 1.90. At the 60% cupric level, the total conversion of acetylene to chlorinated products was 64%; the rate of product formation was 8.56 grams per liter per minute; and the product composition was 47.0% trichlorethylene and 1.2% perchlorethylene. This example demonstrates the importance of providing good contact of the reactants in order to achieve high conversions and high productivity.

Example 5

An aqueous catalyst composition, in the amount of 400 ml., was prepared as follows:

|  | Mols/liter |
| --- | --- |
| $FeCl_3$ | 1.0 |
| $CuCl_2 \cdot H_2O$ | 4.8 |
| CuCl | 0.2 |
| Acetic acid | 3.0 |
| Pyridine hydrochloride | 4.0 |

The conditions were otherwise as in Example 1. The pH-value was 2.3. At the 80% cupric level, the product contained 63% trichlorethylene and 8.4% perchlorethylene, and the rate of formation of trichlorethylene itself (as distinguished from the rate of formation of chlorinated products in general) was 6.38 grams per liter per minute. The use of acetic acid plus pyridine hydrochloride thus gives exceptionally good productivity, with good control and with a high percentage of the product being made up of trichlorethylene plus perchlorethylene.

Example 6

An aqueous catalyst composition, in the amount of 400 ml., was prepared as follows:

| | Mols/liter |
|---|---|
| $CuCl_2 \cdot 2H_2O$ | 5.6 |
| CuCl | 1.4 |
| Picoline hydrochloride | 4.0 |
| Acetic acid | 4.0 |

The pH-value was 4.0. At the 70% cupric level, the rate of product formation was 1.5 grams per liter per minute, and the product contained 13% trichlorethylene and 75% perchlorethylene. This example demonstrates the very high proportion of perchlorethylene which can be obtained as the pH-value is increased above the levels used in the previous examples.

I claim:

1. A process for producing trichlorethylene and/or perchlorethylene which comprises contacting acetylene at a temperature of from about 60° C. to about 130° C. with an aqueous catalyst composition containing (a) from about 2 mols to about 10 mols of copper chloride per liter of solution, at least 50% of the copper content of which is in the cupric form; (b) from about ½ mol to about 6 mols, per liter of solution, of a hydrochloride addition product of a pyridine compound taken from the group consisting of pyridine and derivatives of pyridine containing no more than two substituents, which substituents are attached to a carbon atom in the pyridine ring and are taken from the group consisting of methyl, ethyl, chloro and carboxyl; and (c) at least 0.1 mol per liter of a buffer from the group consisting of phosphoric acid; acetic acid; the ammonium and alkali metal acetates, mono-hydrogen phosphates, and di-hydrogen phosphates; and mixtures thereof; the amount of the buffer being such that, when said aqueous composition is diluted with an equal volume of distilled water, the resulting diluted solution exhibits a pH-value in the range of about 1 to about 6.

2. A process according to claim 1 wherein the temperature is from about 80° C. to about 120° C.

3. A process according to claim 1 wherein the aqueous composition contains from about 4 to about 8 mols per liter of copper chloride.

4. A process according to claim 1 wherein from about 60% to about 90% of the copper chloride is in the cupric form.

5. A process according to claim 1 wherein the aqueous composition contains from about 0.1 mol to about 2 mols of phosphoric acid per liter.

6. A process according to claim 1 wherein the aqueous composition contains from about ¾ mol to about 5 mols of acetic acid per liter.

7. A process according to claim 1 wherein the aqueous composition contains from about 2 mols to about 4 mols per liter of a supplemental chloride from the group consisting of ammonium and alkali metal chlorides.

8. A process according to claim 1 wherein the hydrochloride addition product is pyridine hydrochloride.

9. A process for producing trichlorethylene and/or perchlorethylene which comprises contacting acetylene at a temperature from about 80° C. to about 120° C. with an aqueous composition containing (a) from about 4 to about 8 mols of copper chloride per liter of solution, at least 50% of the copper content of which is in the cupric form; (b) from about ½ mol to about 6 mols, per liter of solution, of pyridine hydrochloride; (c) from about 2 mols to about 4 mols per liter of a supplemental halide from the group consisting of ammonium and alkali metal halides; and (d) a phosphoric acid buffer in an amount from about ½ mol to about 2 mols per liter; the amount of the buffer being such that, when said aqueous solution is diluted with an equal volume of distilled water, it exhibits a pH-value of from about 1 to about 6.

10. An aqueous catalyst composition useful for the chlorination of acetylene, said composition consisting essentially of (a) from about 2 mols to about 10 mols of copper chloride per liter of solution, at least 50% of the copper content of which is in the cupric form; (b) from about ½ mol to about 6 mols, per liter of solution, of a hydrochloride addition product of a pyridine compound taken from the group consisting of pyridine and derivatives of pyridine containing no more than two substituents, which substituents are attached to a carbon atom in the pyridine ring and are taken from the group consisting of methyl, ethyl, chloro and carboxyl; and (c) at least 0.1 mol per liter of a buffer from the group consisting of phosphoric acid; acetic acid; the ammonium and alkali metal acetates, mono-hydrogen phosphates, and di-hydrogen phosphates; and mixtures thereof; the amount of the buffer being such that, when said aqueous composition is diluted with an equal volume of distilled water, the resulting diluted solution exhibits a pH-value in the range of about 1 to about 6.

No references cited.

BERNARD HEFLIN, *Acting Primary Examiner.*

J. A. BOSKA, *Assistant Examiner.*